(12) United States Patent
Oe et al.

(10) Patent No.: US 8,746,389 B2
(45) Date of Patent: Jun. 10, 2014

(54) VEHICLE BODY FRAME

(75) Inventors: Togo Oe, Shizuoka (JP); Kuninari Kurabayashi, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/557,758

(22) Filed: Jul. 25, 2012

(65) Prior Publication Data
US 2013/0026733 A1    Jan. 31, 2013

(30) Foreign Application Priority Data

Jul. 26, 2011   (JP) ................................ 2011-163010

(51) Int. Cl.
*B62K 11/02*   (2006.01)
(52) U.S. Cl.
USPC ............................ 180/219; 180/311; 180/312
(58) Field of Classification Search
USPC .......................................... 180/219, 312, 311
See application file for complete search history.

(56) References Cited

U.S. PATENT DOCUMENTS

| | | | | |
|---|---|---|---|---|
| 5,353,888 | A | * | 10/1994 | Tsukahara ..................... 180/219 |
| 6,481,522 | B1 | * | 11/2002 | Adachi .......................... 180/219 |
| 7,360,619 | B2 | | 4/2008 | Adachi et al. |
| 7,503,575 | B2 | * | 3/2009 | Kurokawa et al. ............ 280/279 |
| 7,694,985 | B2 | * | 4/2010 | Hoshi ............................ 280/274 |
| 2004/0182634 | A1 | | 9/2004 | Adachi et al. |
| 2006/0157955 | A1 | * | 7/2006 | Kurokawa et al. ............ 280/279 |
| 2006/0273542 | A1 | * | 12/2006 | Chamberlain ................. 280/274 |

FOREIGN PATENT DOCUMENTS

JP    4132431    8/2008
JP    4233022    3/2009

* cited by examiner

*Primary Examiner* — Joseph M Rocca
*Assistant Examiner* — Marlon Arce
(74) *Attorney, Agent, or Firm* — Troutman Sanders LLP (57) ABSTRACT

A head pipe of a vehicle body frame includes an upper side head pipe with a pair of upper and lower facing piece parts extending from an upper side pipe part so as to fit to upper and lower wall portions of a pair of right and left main frames, a lower side head pipe with a lower side pipe part joined to the upper side pipe part and a front side tongue piece part extending from the lower side pipe part so as to fit to a front wall portion of a down frame, and a reinforcing member joined to a rear portion of the upper side head pipe and having a rear side tongue piece part extending so as to fit to a rear wall portion of the down frame from a vertical wall part positioned between inner side wall portions of the main frames.

4 Claims, 12 Drawing Sheets

VEHICLE BODY FRAME

CROSS-REFERENCE TO RELATED APPLICATION

This application is based upon and claims the benefit of priority of the prior Japanese Patent Application No. 2011-163010, filed on Jul. 26, 2011, the entire contents of which are incorporated herein by reference.

BACKGROUND OF THE INVENTION

1. Field of the Invention

The present invention relates to a vehicle body frame of a motorcycle, and particularly to a vehicle body frame suitable for an off-road type motorcycle.

2. Description of the Related Art

In general, as a method of molding a head pipe of a vehicle body frame, a method using casting and molding and a method using forging and molding have been known. In the casting and molding, the degree of design freedom is high, and structure members can correspond to a complex shape, but an internal defect such as a blowhole sometimes remains. On the other hand, in the forging and molding, the sufficient degree of design freedom cannot be obtained but a highly rigid and strong product having no internal defect can be obtained. For this reason, one having a high load to act on a head pipe such as an off-road type motorcycle, for example, is molded by the forging and molding.

Conventionally, as one in which a head pipe is molded by the forging and molding, one molded with right and left split molds has been known (see Patent Document 1, for example). As for a head pipe in Patent Document 1, a cylindrical part for supporting a steering shaft, and joint parts for a pair of right and left main frames and a down frame are formed simultaneously by right and left split molds. On the upper portion rear side of the cylindrical part, a vertical wall part extending outward (rearward) in a radial direction is provided, and the paired right and left main frames are joined to annular wall parts projecting in right and left directions from the above vertical wall part. The down frame is joined to a pair of tongue piece parts projecting from the lower portion rear side of the cylindrical part so as to face each other in up and down directions.

Further, as one in which a head pipe is molded by the forging and molding, one molded with front and rear split molds has also been known (see Patent Document 2, for example). As for a head pipe in Patent Document 2, a cylindrical part for supporting a steering shaft, and joint parts for a pair of right and left main frames and a down frame are formed simultaneously by front and rear split molds. The pair of right and left main frames is joined to an upper side tongue piece part projecting from the upper portion rear side of the cylindrical part so as to fit to upper wall portions of the main frames. The down frame is joined to a lower side tongue piece part projecting from the lower portion rear side of the cylindrical part so as to fit to a front wall portion of the down frame.

[Patent Document 1] Japanese Patent No. 4132431
[Patent Document 2] Japanese Patent No. 4233022

However, in the head pipe described in Patent Document 1, annular projecting parts project in the right and left directions perpendicular to the vertical wall part by the restriction of undercut of the right and left split molds. In the above case, the annular wall parts are joined to the main frames so that tips of the annular wall parts bump into side wall portions of the main frames. Due to changes in cross-sectional areas of the portions where the main frames and the annular wall parts bump into each other, the rigidity of a vehicle body frame changes suddenly, and thus there has been a problem that the stress concentration in the main frames cannot be alleviated.

Further, in the head pipe described in Patent Document 2, the upper side tongue piece part and the lower side tongue piece part that extend in forward and rearward directions are molded by the front and rear split molds, so that the depth of the molds is increased and a processing stroke at the time of forging is lengthened. For this reason, a large-scale processing machine is required and a processing time is prolonged. Further, a load to act on the molds is large, so that the lifetime of the molds is shortened. Thus, a problem that the molding cost of the head pipe increases has been caused. Further, the head pipe in Patent Documents 1 and 2 is subjected to the restriction by undercut of the molds, so that a problem that wastes are increased to thereby increase the weight of the whole vehicle body frame has also been caused.

SUMMARY OF THE INVENTION

The present invention has been made in consideration of such points, and has an object to provide a vehicle body frame securing the degree of design freedom, capable of being molded at a low cost, and having appropriate strength.

A vehicle body frame of the present invention includes: a head pipe; a pair of right and left main frames extending rearward from the head pipe; and a down frame extending downward from the head pipe, in which the head pipe further includes: an upper side head pipe provided with an upper side pipe part and a pair of upper and lower facing piece parts extending from the upper side pipe part so as to fit to upper wall portions and lower wall portions of the main frames; a lower side head pipe provided with a lower side pipe part joined to the upper side pipe part and a front side tongue piece part extending from the lower side pipe part so as to fit to a front wall portion of the down frame; and a reinforcing member that is provided with a vertical wall part positioned between the inner side wall portions of the pair of main frames and a rear side tongue piece part extending from the vertical wall part so as to fit to a rear wall portion of the down frame and is joined to a rear portion of the upper side head pipe.

Further, in the vehicle body frame of the present invention, the upper side head pipe is forged by right and left split molds, the lower side head pipe is forged by obliquely split molds having forging directions inclined rearward with respect to vertical directions, and the reinforcing member is forged by obliquely split molds having forging directions inclined forward and downward with respect to forward and rearward directions.

Further, in the vehicle body frame of the present invention, on the reinforcing member, a pair of right and left rear extending parts extending rearward from the vertical wall part along the inner side wall portions of the pair of right and left main frames is provided.

Further, in the vehicle body frame of the present invention, the vertical wall part of the reinforcing member is joined to rear end portions of the pair of upper and lower facing piece parts, and in a side view, a straight line connecting joint areas of the vertical wall part joined to the pair of upper and lower facing piece parts and a straight line connecting rear end portions of the rear extending parts and a rear end portion of the rear side tongue piece part are formed to be substantially parallel to each other.

Further, in the vehicle body frame of the present invention, middle portions of the pair of right and left main frames and a middle portion of the down frame are coupled via a bridge pipe, and to the rear side tongue piece part of the reinforcing member, a bridge pipe attachment part for attaching the bridge pipe is joined so as to fit to the rear wall portion of the down frame.

Further, the vehicle body frame of the present invention, on the front side tongue piece part of the lower side head pipe, a pair of side wall parts is provided so as to fit to both side wall portions of the down frame, and the pair of side wall parts is joined to the upper side pipe part in a manner to extend upward rather than a joint surface of the upper side pipe part and the lower side pipe part.

DETAILED DESCRIPTION OF THE PREFERRED EMBODIMENTS

Hereinafter, an embodiment will be explained in detail with reference to the attached drawings. Incidentally, in the following, this embodiment will be explained by using an example where a vehicle body frame according to this embodiment of the present invention is applied to an off-road type motorcycle, but is not limited to this and can be changed appropriately. For example, the vehicle body frame of the present invention is applicable also to a motorcycle in another type.

Figure 1:
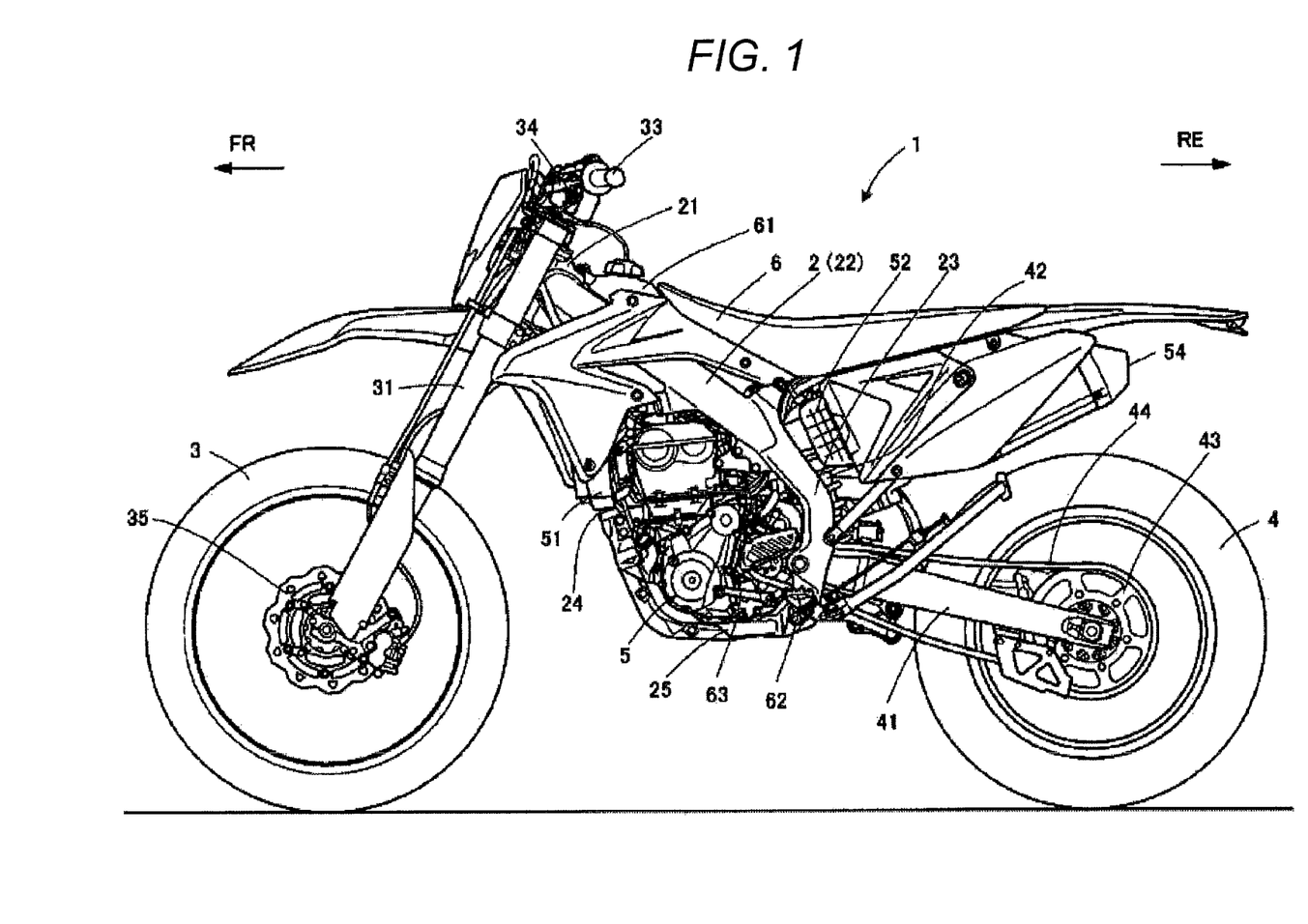
FIG. 1 is a left side view of a motorcycle according to an embodiment.

With reference to FIG. 1, the entire schematic structure of a motorcycle 1 according to this embodiment will be explained. FIG. 1 is a left side view of the motorcycle 1 according to this embodiment. Note that in FIG. 1, the front and rear of the motorcycle 1 are indicated by an arrow FR and an arrow RE respectively.

As illustrated in FIG. 1, the motorcycle 1 includes a vehicle body frame 2 made of steel or an aluminum alloy. On the vehicle body frame 2, a drive source, and respective units such as electrical component systems are mounted. A pair of right and left main frames 22 of the vehicle body frame 2 separates right and left rearward from a head pipe 21 positioned at a front end of the main frames 22 to extend obliquely downward. A pair of right and left swing arm brackets 23 extends downward from respective rear end portions of the pair of right and left main frames 22. Further, a down tube (down frame) 24 of the vehicle body frame 2 extends substantially downward from the head pipe 21. Lower tubes 25 separated right and left extend substantially horizontally rearward from a lower end portion of the down tube 24 to be coupled to respective lower end portions of the pair of right and left swing arm brackets 23.

A front fork 31 is turnably supported to a front end of the vehicle body frame 2 via a not-illustrated steering shaft provided in the head pipe 21. A handle bar (not-illustrated) is provided on an upper end of the steering shaft, and a grip 33 is mounted on both ends of the handle bar. A clutch lever 34 is disposed on the left front of the handle bar, and a brake lever (not-illustrated) for a front wheel 3 is disposed on the right front of the handle bar. The front wheel 3 is rotationally supported on a lower portion of the front fork 31. A brake disc 35 constituting a brake for the front wheel is provided on the front wheel 3.

Swing arms 41 are coupled to the pair of right and left swing arm brackets 23 of the vehicle body frame 2 to be swingable in up and down directions. A suspension 42 is attached between the vehicle body frame 2 and the swing arms 41. A rear wheel 4 is rotationally supported on rear portions of the pair of right and left swing arms 41. A driven sprocket 43 is provided on the left side of the rear wheel 4. Then, it is structured so that motive power from an engine unit 5 is transmitted to the rear wheel 4 by a drive chain 44. A brake disc (not-illustrated) constituting a brake for the rear wheel 4 is provided on the right side of the rear wheel 4.

The water-cooled engine unit 5 to be a drive source is mounted in a space substantially surrounded by the vehicle body frame 2. A radiator 51 is disposed at the front of the engine unit 5, and an air clear box 52 provided with a filter is disposed at the rear of the engine unit 5. Further, a fuel tank 61 having a fuel housed therein is disposed above the engine unit 5, and a seat 6 is disposed at the rear of the fuel tank 61. Foot rests 62 are provided below the seat 6. A shift pedal 63 is provided at the front of the foot rest 62 on the left side of the vehicle body, and a brake pedal (not-illustrated) for the rear wheel 4 is provided at the front of the foot rest 62 on the right side of the vehicle body.

The engine unit 5 consists of a transverse crank-type 4-cycle single cylinder engine and a transmission. Air is taken into the engine in the engine unit 5 through an intake pipe (not-illustrated), and the air and fuel are mixed in a fuel injection device and a mixture is supplied to a combustion chamber. Exhaust gas after combustion is discharged from a muffler 54 through an exhaust pipe (not-illustrated) extended rearward on a right side surface of the engine unit 5.

Figure 2:
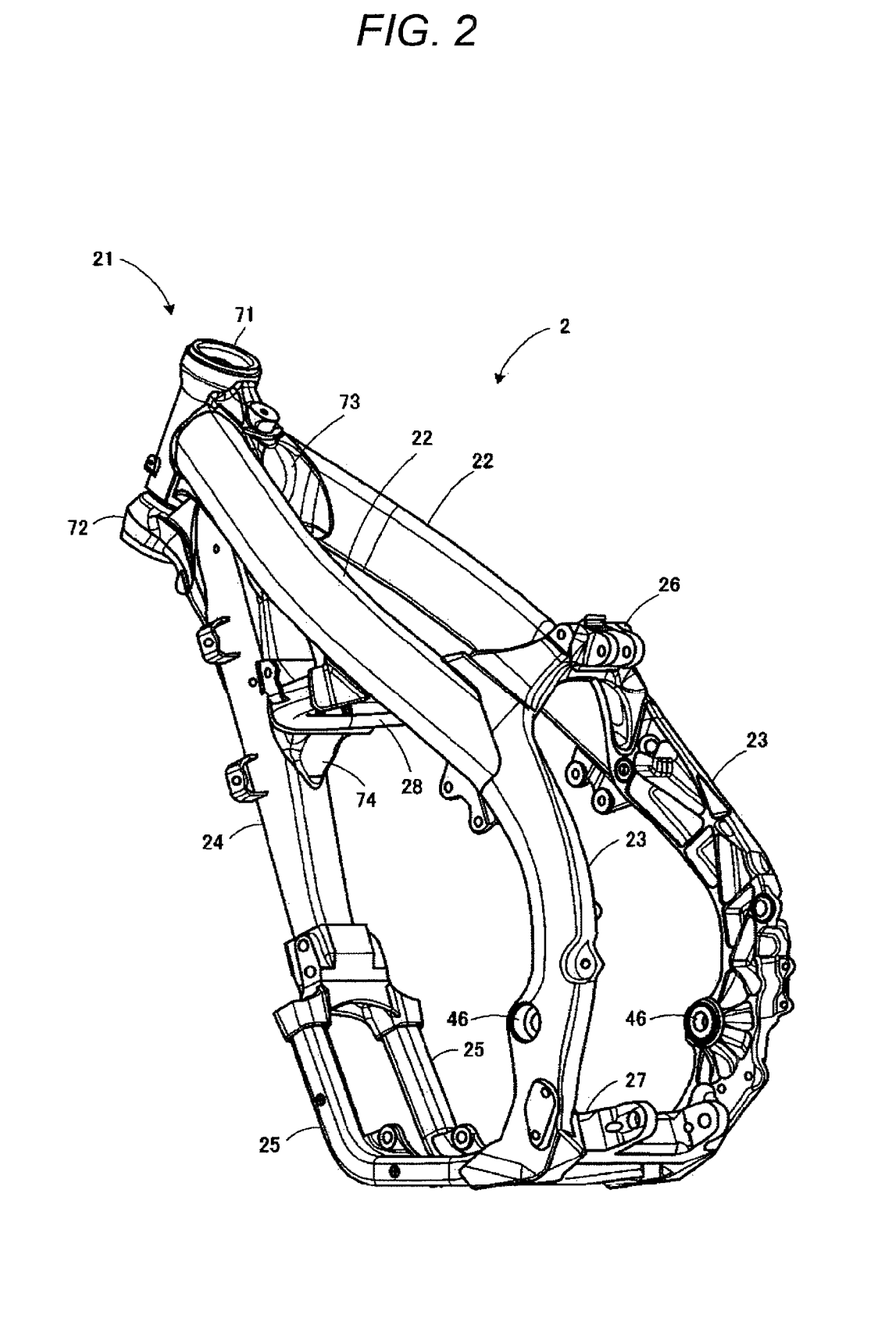
FIG. 2 is a perspective view of a vehicle body frame according to this embodiment.
Figure 3:
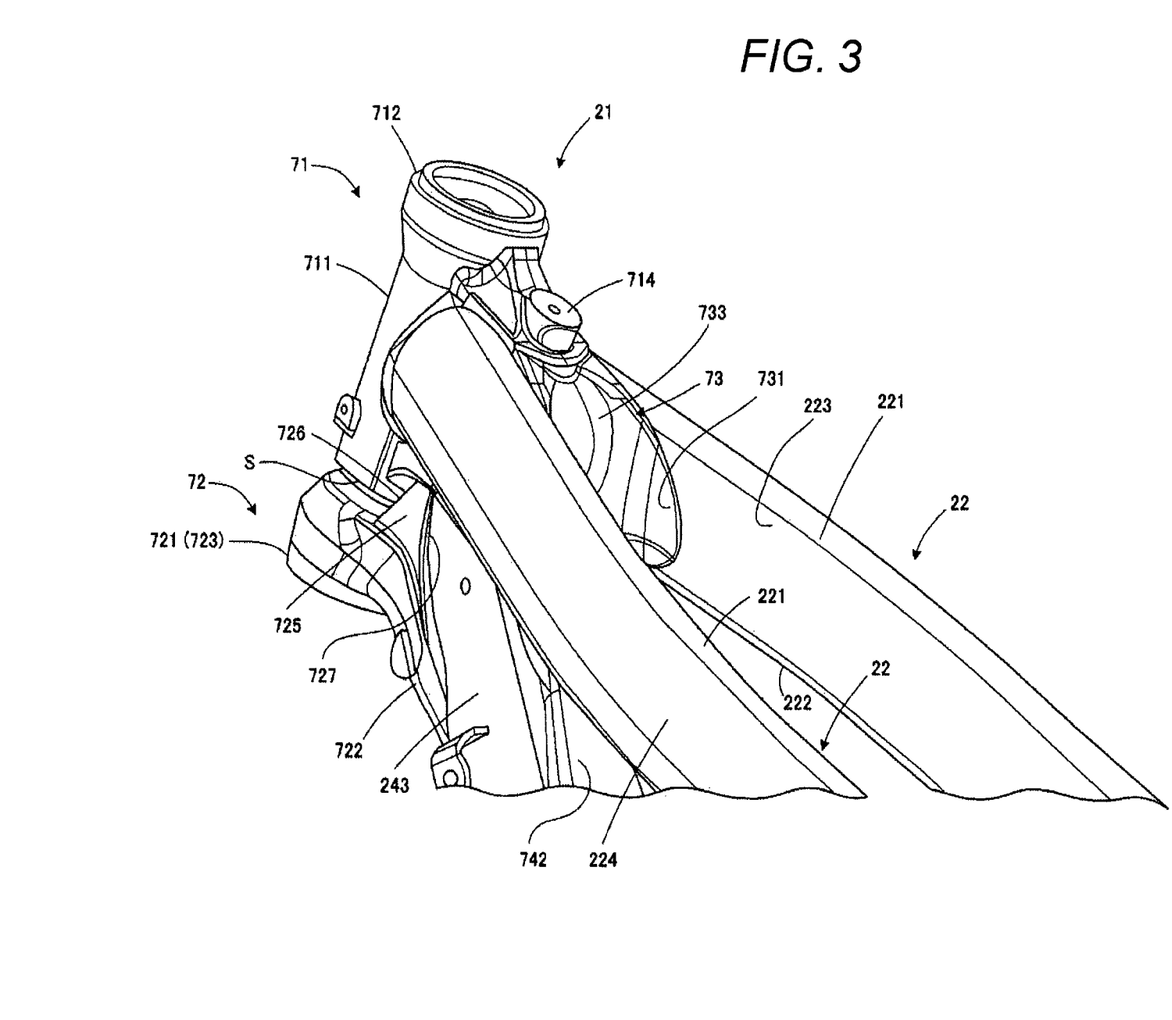
FIG. 3 is an enlarged view of the vicinity of a head pipe of the vehicle body frame according to this embodiment.
Figure 4:
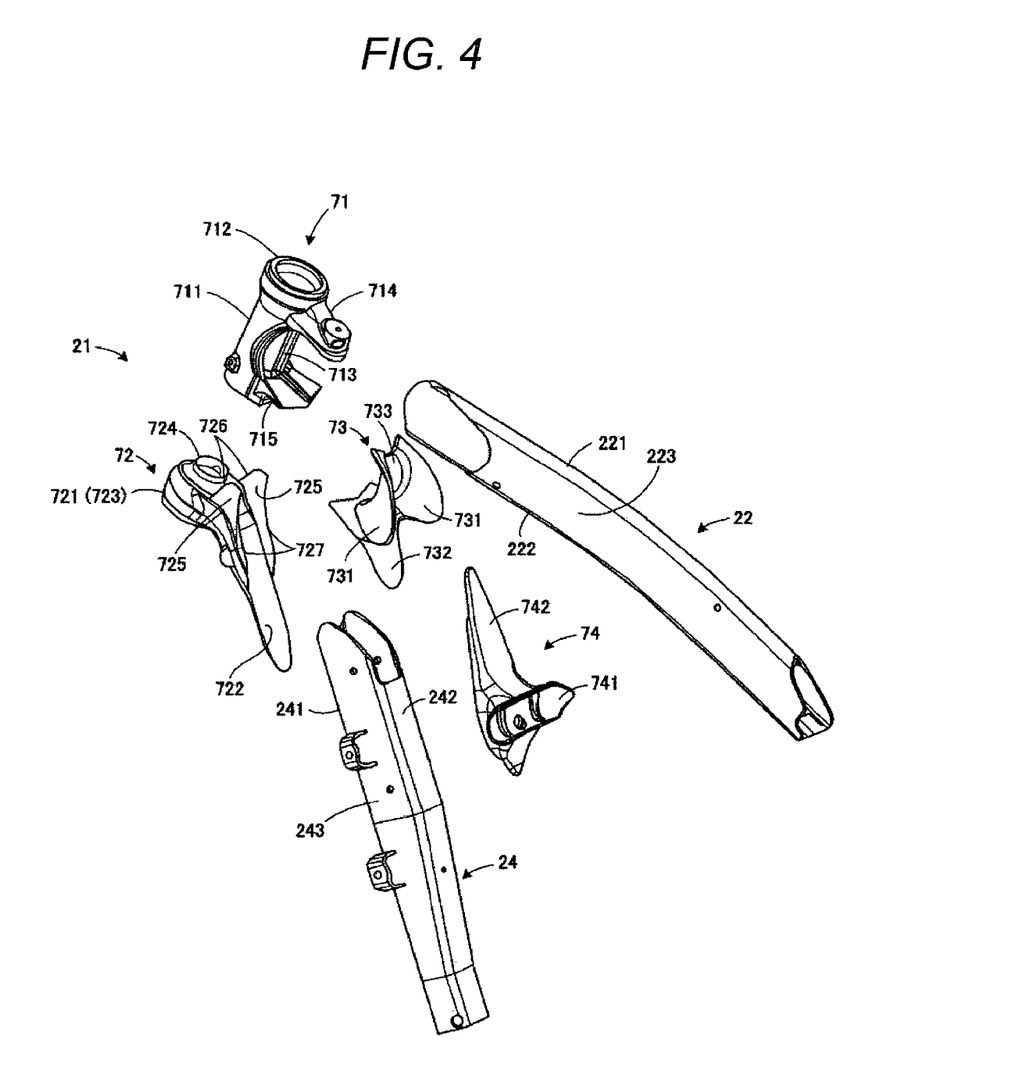
FIG. 4 is an exploded perspective view of the vicinity of the head pipe of the vehicle body frame according to this embodiment.

The vehicle body frame 2 will be explained with reference to FIG. 2 to FIG. 4. FIG. 2 is a perspective view of the vehicle body frame 2 according to this embodiment. FIG. 3 is an enlarged view of the vicinity of the head pipe of the vehicle body frame 2 according to this embodiment. FIG. 4 is an exploded perspective view of the vicinity of the head pipe 21 of the vehicle body frame 2 according to this embodiment.

As illustrated in FIG. 2, the vehicle body frame 2 includes: the head pipe 21; the pair of right and left main frames 22; the pair of right and left swing arm brackets 23; the down tube 24; and the lower tubes 25. The pair of right and left main frames 22 is joined to the head pipe 21, and extended obliquely rearward and downward from the head pipe 21. The pair of right and left swing arm brackets 23 extends downward from the respective rear end portions of the pair of right and left main frames 22. The down tube 24 is joined to the head pipe 21, and extended downward from the head pipe 21. The lower tube 25 bifurcates right and left on the lower side of the down tube 24, and the bifurcated lower tubes 25 extend substantially horizontally rearward to be joined to the respective paired right and left swing arm brackets 23.

The paired right and left main frames 22 are each formed of an aluminum-based wrought product or the like in a hollow manner, and spread out right and left rearward from the head pipe 21 to extend over the engine unit 5. The fuel tank 61 is disposed on upper portions of the pair of right and left main frames 22. The paired right and left swing arm brackets 23 are each formed of an aluminum-based cast product or an aluminum-based forged product, and each have a large number of reinforcing ribs provided on the opened inner surface side. The paired right and left swing arm brackets 23 are coupled via an upper bridge 26 at their upper end portions joined to the paired right and left main frames 22. An upper end portion of the suspension 42 is supported to the above upper bridge 26. Further, the paired right and left main frames 22 are coupled to each other via a bridge pipe 28 at their middle portions in an extending direction of the main frames 22.

The paired right and left swing arm brackets 23 are coupled via a lower bridge 27 at their lower end portions joined to the paired right and left lower tubes 25. Further, the paired right and left swing arm brackets 23 have swing arm pivots 46 that swingably support the swing arms 41 formed on their middle portions in an extending direction of the swing arm brackets 23. The down tube 24 is formed of an aluminum-based wrought product or the like in a hollow manner to extend through the front of the engine unit 5. A middle portion of the down tube 24 in its extending direction is coupled to the middle portions of the main frames 22 via the U-shaped bridge pipe 28. The paired lower tubes 25 are each formed of an aluminum-based wrought product or the like in a hollow manner to extend under the engine unit 5.

By these structure members of the vehicle body frame 2, a housing space for the engine unit 5 and the like is defined. The engine unit 5 is suspended via mounts provided on the swing arm brackets 23, the down tube 24, and the lower tubes 25 to thereby serve as a reinforcing member with respect to the vehicle body frame 2.

As illustrated in FIG. 3 and FIG. 4, the head pipe 21 includes: an upper side head pipe 71; a lower side head pipe 72; and a main frame gusset 73, which are separate members, and is formed in a manner that these members are joined by welding or the like. The upper side head pipe 71, the lower side head pipe 72, and the main frame gusset 73 are each formed of an aluminum-based alloy material by forging and molding. Further, a bridge pipe gusset 74 is also formed of an aluminum-based alloy material by forging and molding. The head pipe 21 is formed into a substantially cylindrical shape by the upper side head pipe 71 and the lower side head pipe 72 being joined. The upper side head pipe 71 is molded by forging with right and left split molds. In the upper side head pipe 71, an upper side pipe part 711, and an upper side flange 714 and a lower side flange 715 being a pair of upper and lower flanges (facing piece parts) are formed. The upper side flange 714 and the lower side flange 715 extend rearward from a rear portion of the upper side pipe part 711 to face each other in the up and down directions. An upper portion of the upper side pipe part 711 is made into an upper bearing housing 712 to which an upper bearing of the steering shaft is fitted, and is formed to have a diameter slightly larger than that of the main body part (the part into which the steering shaft is inserted).

Further, in the rear side of the upper side head pipe 71, an opening portion 713 to which the pair of right and left main frames 22 is attached is formed. An upper side portion and a lower side portion of the opening portion 713 project rearward. Then, the projecting portion of the upper side portion of the opening portion 713 forms the upper side flange 714, and the projecting portion of the lower side portion of the opening portion 713 forms the lower side flange 715. The upper side flange 714 extends so as to fit to upper wall portions 221 of the pair of right and left main frames 22, and the lower side flange 715 extends so as to fit to lower wall portions 222 of the pair of right and left main frames 22. To both side side portions of the opening portion 713 of the upper side head pipe 71, respective outer side wall portions 224 of the pair of right and left main frames 22 are joined. To the upper side flange 714, the upper wall portions 221 of the pair of right and left main frames 22 are joined. To the lower side flange 715, the lower wall portions 222 of the pair of right and left main frames 22 are joined. Then, by the upper side flange 714 and the lower side flange 715, the joint length of the upper side head pipe 71 and the main frames 22 is lengthened.

The lower side head pipe 72 is molded by forging with upper and lower split molds. In the lower side head pipe 72, a lower side pipe part 721 and a front side tongue piece part 722 are molded. The lower side pipe part 721 is made into a lower bearing housing 723 to which a lower bearing of the steering shaft is fitted. Further, on an upper surface of the lower side pipe part 721, a joint part 724 projecting annularly toward the upper side pipe part 711 is provided. To the lower side pipe part 721, the upper side head pipe 71 is joined via the joint part 724, and to the front side tongue piece part 722, a front wall portion 241 of the down tube 24 is joined.

The front side tongue piece part 722 is formed into a plate shape (tongue piece shape), and extended downward from the lower side pipe part 721 so as to fit to the front wall portion 241 of the down tube 24. On the base end side (lower side pipe part 721 side) of the front side tongue piece part 722, a pair of side wall parts 725 rising from both side side portions of the front side tongue piece part 722 in its width direction is provided. The rigidity of the front side tongue piece part 722 is increased by the above pair of side wall parts 725, so that the front side tongue piece part 722 can be formed thinly. The pair of side wall parts 725 extends upward rather than a joint surface S of the lower side pipe part 721 and the upper side pipe part 711. Then, each of the pair of side wall parts 725 has a front inclined portion 726 inclined forward and a rear inclined portion 727 inclined rearward, and is formed into a substantially triangular shape such that its width is narrowed upward in a side view. To the front inclined portions 726 of the pair of side wall parts 725, the upper side head pipe 71 is joined. Further, each of the pair of side wall parts 725 is molded so as to fit to each of both side wall portions 243 of the down tube 24, and the rear inclined portions 727 are joined to the respective right and left side wall portions 243 of the down tube 24. By the above pair of side wall parts 725, the joint length of the lower side head pipe 72, the upper side head pipe 71, and the down tube 24 is lengthened.

To rear end portions of the upper side flange 714 and the lower side flange 715, the main frame gusset (reinforcing member) 73 coupling inner side wall portions 223 of the pair of right and left main frames 22 is joined at the rear of the upper side head pipe 71. The main frame gusset 73 is molded by forging with front and rear split molds. The main frame gusset 73 is provided with a vertical wall part 733, a pair of right and left rear extending parts 731, and a rear side tongue piece part 732. The vertical wall part 733 is positioned between the inner side wall portions 223 of the pair of right and left main frames 22 to join (couple) the inner side wall portions 223 of the pair of right and left main frames 22 to each other. The vertical wall part 733 is curved to bulge rearward in a side view. Then, the vertical wall part 733, at an upper portion thereof, is joined to the rear end portion of the upper side flange 714, and the vertical wall part 733, at a lower portion thereof, is joined to the rear end portion of the lower side flange 715. The pair of right and left rear extending parts 731 and the rear side tongue piece part 732 are each formed into a plate shape (tongue piece shape). The pair of right and left rear extending parts 731 extends rearward from side portions of the vertical wall part 733 so as to fit to the inner side wall portions 223 of the pair of right and left main frames 22. The rear side tongue piece part 732 extends rearward from the lower portion of the vertical wall part 733 so as to fit to a rear wall portion 242 of the down tube 24.

The paired right and left rear extending parts 731 are formed curvedly so as to smoothly connect the vertical wall part 733 and the inner side wall portions 223 of the pair of right and left main frames 22 (so as not to cause sudden changes in dimension, shape and direction, for example). By the above pair of right and left rear extending parts 731, a change in rigidity in the joint portion of the main frames 22 and the head pipe 21 is suppressed to be small, and thereby the stress concentration of the main frames 22 is alleviated. To the paired right and left rear extending parts 731, the inner side wall portions 223 of the pair of right and left main frames 22 are joined respectively. To the rear side tongue piece part 732, the rear wall portion 242 of the down tube 24 is joined. By the pair of right and left rear extending parts 731, the joint length of the main frame gusset 73 and the pair of right and left main frames 22 is lengthened. By the rear side tongue piece part 732, the joint length of the main frame gusset 73 and the down tube 24 is lengthened.

To a lower end portion of the rear side tongue piece part 732, the bridge pipe gusset (a bridge pipe attachment part) 74 for attaching the bridge pipe 28 is joined. The bridge pipe gusset 74 is molded by forging with obliquely split molds. In the bridge pipe gusset 74, an attachment part 741 and a joint piece part 742 are molded. To the attachment part 741, the bridge pipe 28 joining the pair of right and left main frames 22 and the down tube 24 is joined. The joint piece part 742 has a tongue piece shaped structure extending substantially upward from the attachment part 741 so as to fit to the rear wall portion 242 of the down tube 24. Then, to the joint piece part 742, the rear wall portion 242 of the down tube 24 and the lower end portion of the rear side tongue piece part 732 are joined. By the joint piece part 742, the joint length of the bridge pipe gusset 74 and the down tube 24 is lengthened.

As above, the head pipe 21 is formed in a manner by which plural separate parts in which the directions to forge differ are joined. According to the structure as above, it is possible to decrease the restriction by undercut of molds to then increase the degree of design freedom. Accordingly, wastes can be decreased to achieve a reduction in weight, and a processing stroke of each of the members at the time of forging can be decreased. Further, the head pipe 21 according to this embodiment has the long joint lengths between the members, so that the head pipe 21 can obtain the sufficient joint strength even though the head pipe 21 is formed by the plural members being joined. Hereinafter, the joint structure of the head pipe 21 will be explained.

With reference to FIG. 5A to FIG. 5D, the joint structure of the head pipe 21 will be explained. FIG. 5A to FIG. 5D are an explanatory view of the joint structure of the head pipe according to this embodiment. Note that FIG. 5A to FIG. 5D each schematically illustrate the structure member (frame structure) of the head pipe 21.

Figure 5A:
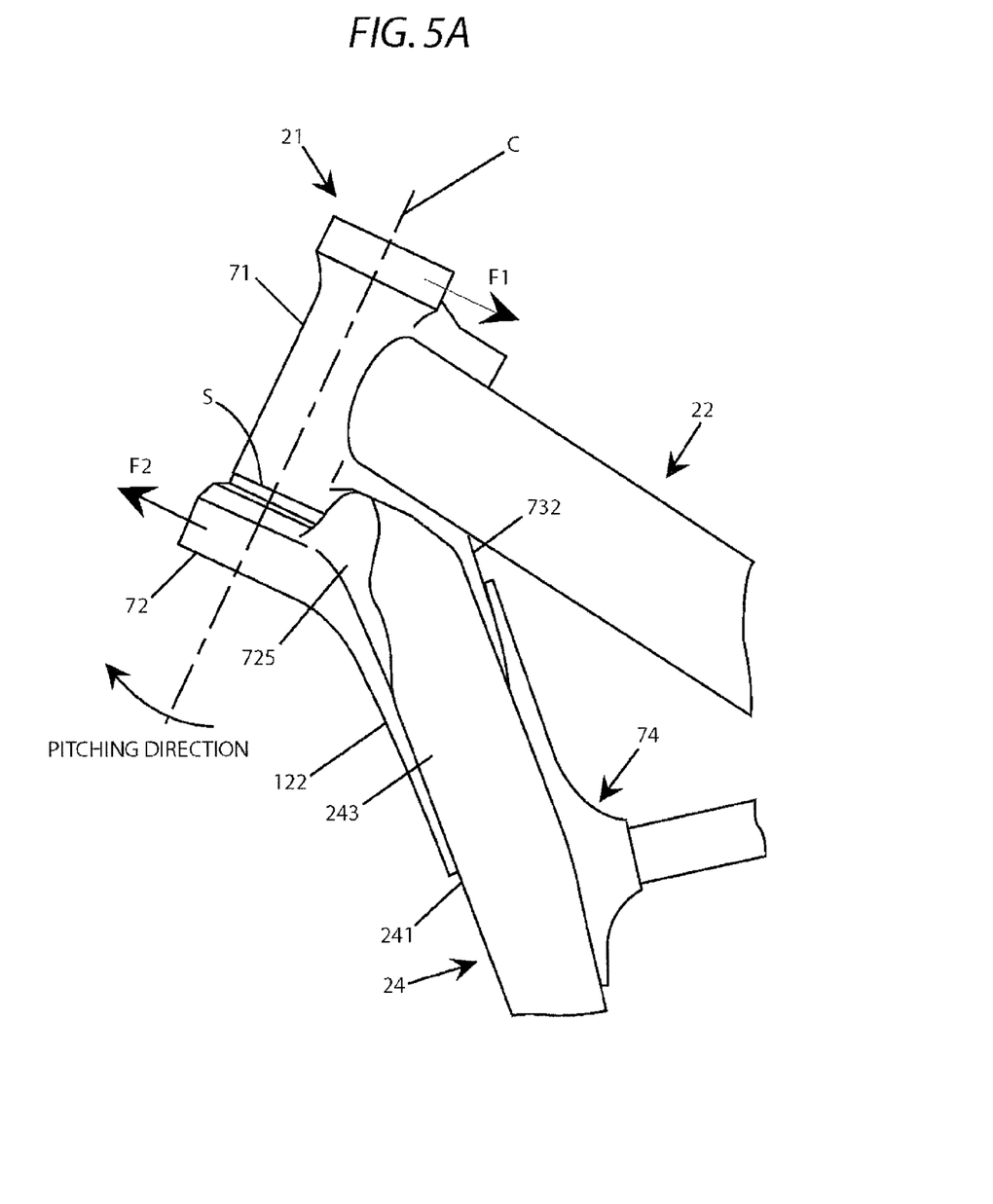
FIG. 5A is a side view of the vicinity of the head pipe.

FIG. 5A is a side view of the vicinity of the head pipe 21. As illustrated in FIG. 5A, an axis C of the head pipe 21 is inclined with respect to the vertical by only a caster angle. For this reason, a load in a pitching direction occurs with respect to the head pipe 21 due to thrusting up from a road surface, braking force of brakes, or the like. Then, the steering shaft is supported in the head pipe 21 via the upper and lower bearings, so that a load F1 acts rearward on the upper side head pipe 71 via the upper bearing, and a load F2 acts forward on the lower side head pipe 72 via the lower bearing. In the above case, the load F1 acts on the upper side head pipe 71 in the direction in which the upper side head pipe 71 is pushed in the main frames 22, so that the effect that the load F1 has on the joint area is relatively small. On the other hand, the load F2 acts on the lower side head pipe 72 in the direction in which the lower side head pipe 72 is pulled apart from the down tube 24, so that the joint area of the upper side head pipe 71 and the down tube 24 is greatly affected by the load F2.

On the lower side head pipe 72 of the head pipe 21 according to this embodiment, the pair of side wall parts 725 is provided. Then, (the front inclined portions 726) of the above pair of side wall parts 725 and the rear side of the upper side head pipe 71 are joined. For this reason, the load F2 acts on the pair of side wall parts 725 in the direction in which the pair of side wall parts 725 is pushed in the upper side head pipe 71. Further, the lower side head pipe 72 and the upper side head pipe 71 are joined not only on the joint surface S but also in the directions to intersect with the joint surface S by the pair of side wall parts 725. By the joining as above, the joint strength of the lower side head pipe 72 and the upper side head pipe 71 is increased.

Further, each of the pair of side wall parts 725 of the lower side head pipe 72 is molded so as to fit to each of the right and left side wall portions 243 of the down tube 24, and the pair of side wall parts 725 of the lower side head pipe 72 is joined to the side wall portions 243 of the down tube 24. Further, the front side tongue piece part 722 is joined to the front wall portion 241 of the down tube 24. Then, the front side tongue piece part 722 extends along the front wall portion 241 of the down tube 24 to make the joint length long. As above, the pair of side wall parts 725 and the front side tongue piece part 722 are joined so as to surround the down tube 24, so that the joint strength of the lower side head pipe 72 and the down tube 24 is increased. Thus, even though the load F2 acts on the lower side head pipe 72, the sufficient joint strength can be obtained.

In the above case, the front side tongue piece part 722 extends from the lower side pipe part 721 so that its width is narrowed as it goes to its lower end portion (see, FIG. 4), and the pair of side wall parts 725 (rear inclined portions 727) is formed so as to be decreased in height as it goes to the lower end portion of the front side tongue piece part 722. As above, the front side tongue piece part 722 and the pair of side wall parts 725, the cross-sectional areas increase gradually as they go to the head pipe 21 side. For this reason, a change in rigidity from the lower end portion of the front side tongue piece part 722 to the head pipe 21 becomes gradual and the stress concentration in the down tube 24 is alleviated.

Figure 5B:
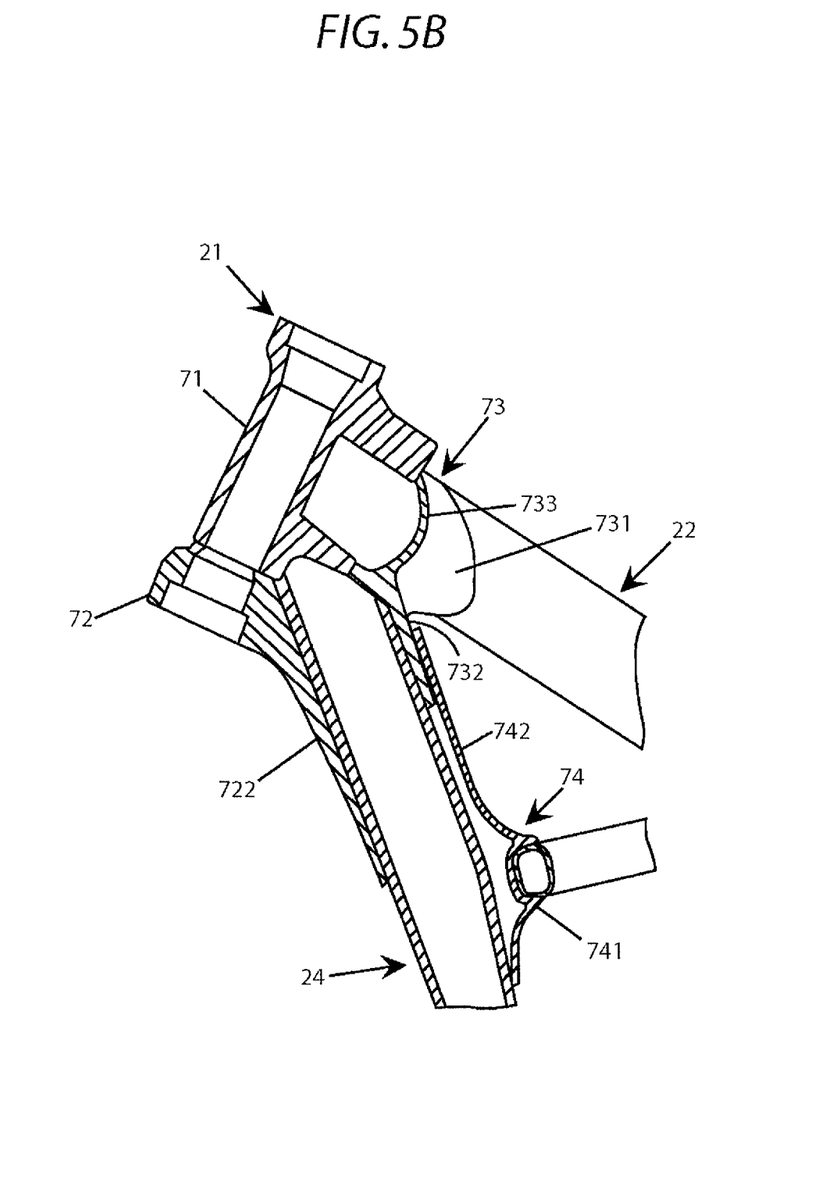
FIG. 5B is a cross-sectional view in which the vicinity of the head pipe is seen from the side.
Figure 5C:
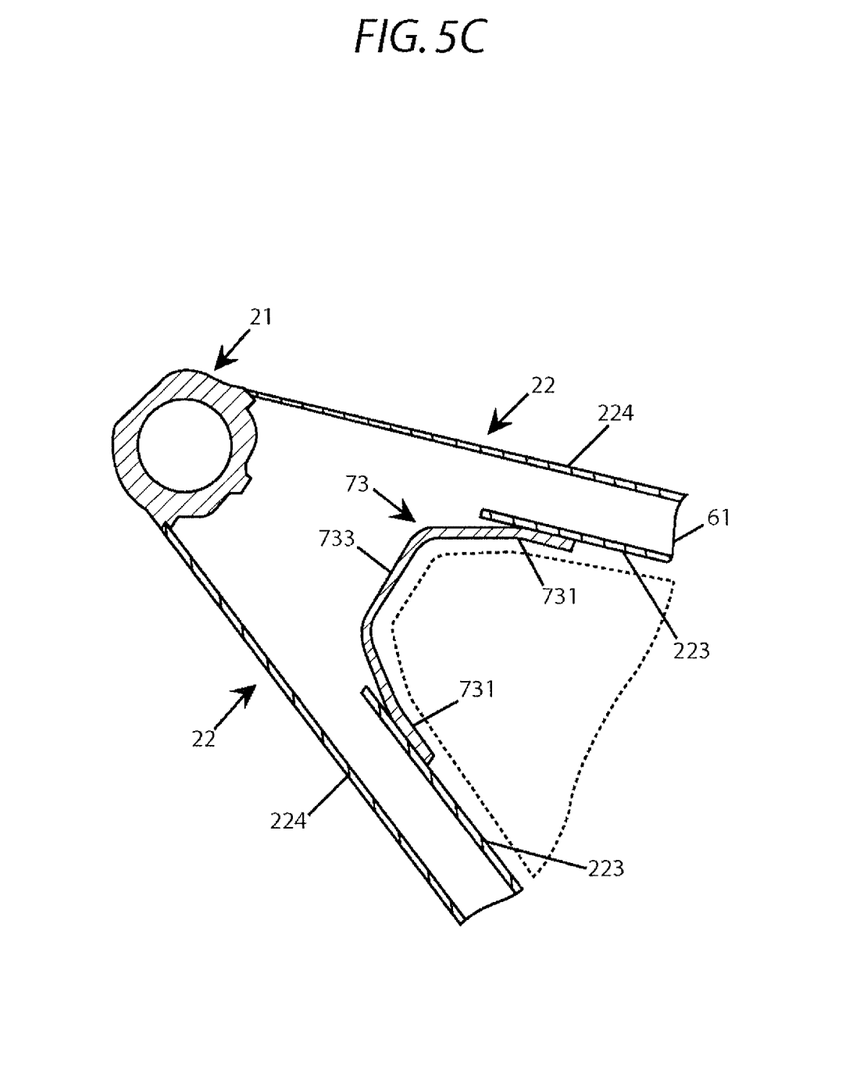
FIG. 5C is a cross-sectional view in which the vicinity of the head pipe is seen from above (or below)

FIG. 5B is a cross-sectional view in which the vicinity of the head pipe 21 is seen from the side. FIG. 5C is a cross-sectional view in which the vicinity of the head pipe 21 is seen from above (or below). As illustrated in FIG. 5B, the paired right and left rear extending parts 731 of the main frame gusset 73 extend rearward from the vertical wall part 733 along the respective inner side wall portions 223 of the pair of right and left main frames 22. Each of the pair of right and left rear extending parts 731 is formed into a substantially semi-circular shape whose width is narrowed toward a rear end of the rear extending part 731 in its extending direction in a side view. Further, as illustrated in FIG. 5C, the paired right and left rear extending parts 731 are curved so as to smoothly connect the vertical wall part 733 and the pair of right and left main frames 22 (so as not to make, for example, bent portions or the like exist). As above, the cross-sectional area of the main frame gusset 73 increases gradually as it goes to the head pipe 21 side. For this reason, a change in rigidity from rear end portions of the rear extending parts 731 to the vertical wall part 733 becomes gradual, and the stress concentration in the main frames 22 is alleviated.

In the above case, each outer edge portion of the pair of right and left rear extending parts 731 is formed into a substantially semicircular shape, so that a weld bead is formed by a gentle curve. For this reason, the joint length is lengthened and cracks of end portions of the bead are prevented, so that the joint strength of the main frame gusset 73 and the main frames 22 is increased. Further, from the rear side tongue piece part 732 of the main frame gusset 73, the bridge pipe gusset 74 is extended, and thereby the joint strength of the down tube 24 and the main frame gusset 73 is increased.

Incidentally, on the front side of the pair of right and left main frames 22, the fuel tank 61 is disposed, and thus a space at the rear of the head pipe 21 is decreased (see FIG. 5C). For this reason, when the head pipe is integrally molded by forging normally, it is not possible to put flesh on the portion at the rear of the head pipe. However, in this embodiment, the paired right and left rear extending parts 731 are provided so as to fit to the inner side wall portions 223 of the pair of right and left main frames 22. For this reason, it becomes possible to suppress the interference between the fuel tank 61 and the head pipe 21 and to put flesh on the portion at the rear of the head pipe 21.

Figure 5D:
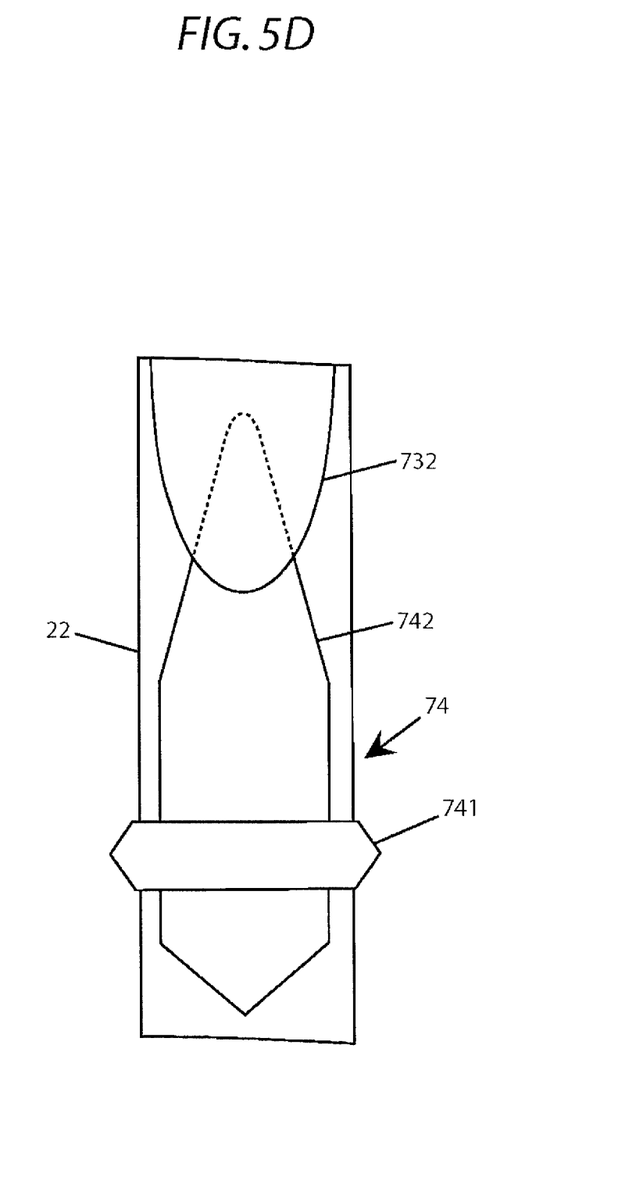
FIG. 5D is a view in which the vicinity of a bridge pipe gusset is seen from obliquely above.

FIG. 5D is a view in which the vicinity of the bridge pipe gusset 74 is seen from obliquely above. The bridge pipe gusset 74 has the upper end side of the joint piece part 742 joined to the lower end side of the rear side tongue piece part 732 of the main frame gusset 73. In the above case, as illustrated in FIG. 5D, the width of the joint piece part 742 is narrowed upward, and the width of the rear side tongue piece part 732 is narrowed downward. Thus, the cross-sectional area of the portion where the joint piece part 742 and the rear side tongue piece part 732 overlap increases gradually as it goes downward from the upper end of the joint piece part 742. For this reason, a sudden increase (change) in rigidity is suppressed, and the stress concentration in the joint piece part 742 and the rear side tongue piece part 732 is alleviated.

With reference to FIG. 6A to FIG. 6D, methods of forging the upper side head pipe 71, the lower side head pipe 72, the main frame gusset 73, and the bridge pipe gusset 74 will be explained. FIG. 6A to FIG. 6D are explanatory views of the methods of forging the upper side head pipe 71, the lower side head pipe 72, the main frame gusset 73, and the bridge pipe gusset 74 according to this embodiment respectively. Further, an arrow F in FIG. 6A to FIG. 6D schematically indicates a forging direction (a mold moving direction).

Incidentally, split directions of molds in this embodiment indicate from which direction each of the members is forged based on the orientation of the motorcycle 1. Thus, at the time of forging actually, the members are not forged back and forth, up and down, right and left, and obliquely by the front and rear split molds, the upper and lower split molds, the right and left split molds, and the obliquely split molds respectively, but are forged in, for example, the up and down directions with these molds.

Figure 6A:
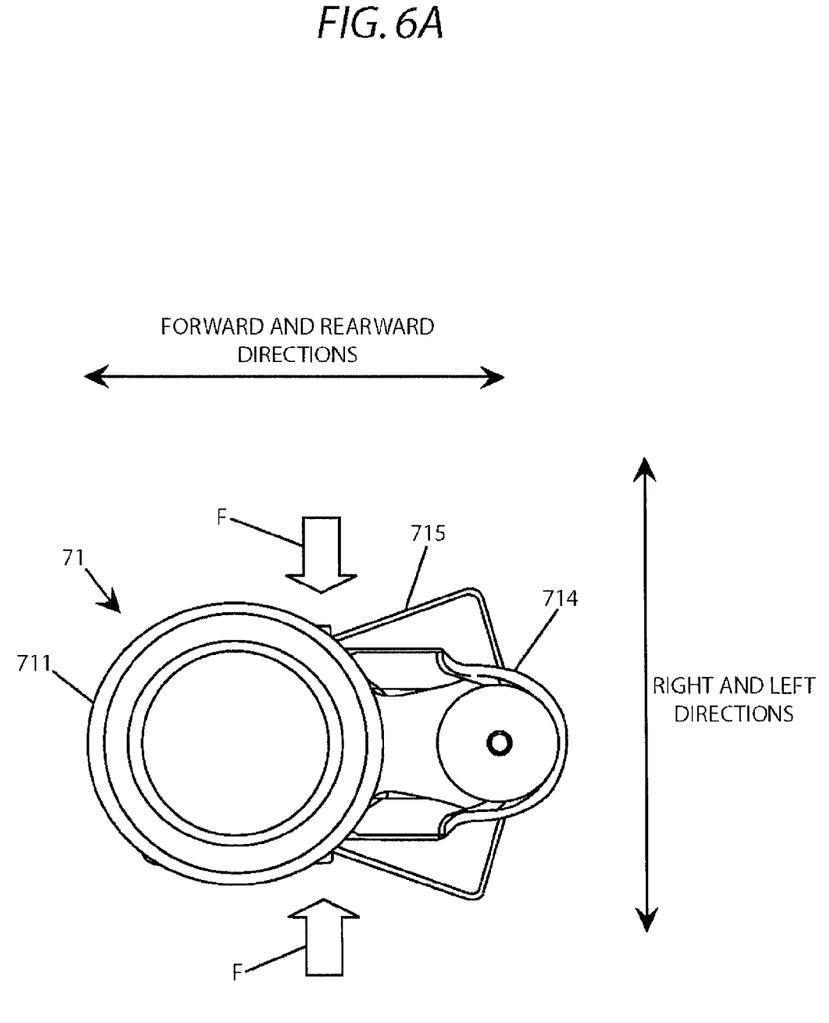
FIG. 6A is a view schematically illustrating a method of forging an upper side head pipe.

FIG. 6A is a view schematically illustrating the method of forging the upper side head pipe 71. As illustrated in FIG. 6A, the upper side head pipe 71 is forged by the right and left split molds. If the upper side head pipe 71 in this shape is forged by the front and rear split molds, the portion between the upper side pipe part 711 and the lower side flange 715 becomes undercut, and if the upper side head pipe 71 is forged by the upper and lower split molds, the portion between the upper side flange 714 and the lower side flange 715 becomes undercut (see FIG. 4). Further, the upper side head pipe 71 has the minimum dimension in the right and left directions. Thus, the forging directions are set to the right and left directions, thereby making it possible to decrease wastes and further to shorten a processing stroke at the time of forging.

Figure 6B:
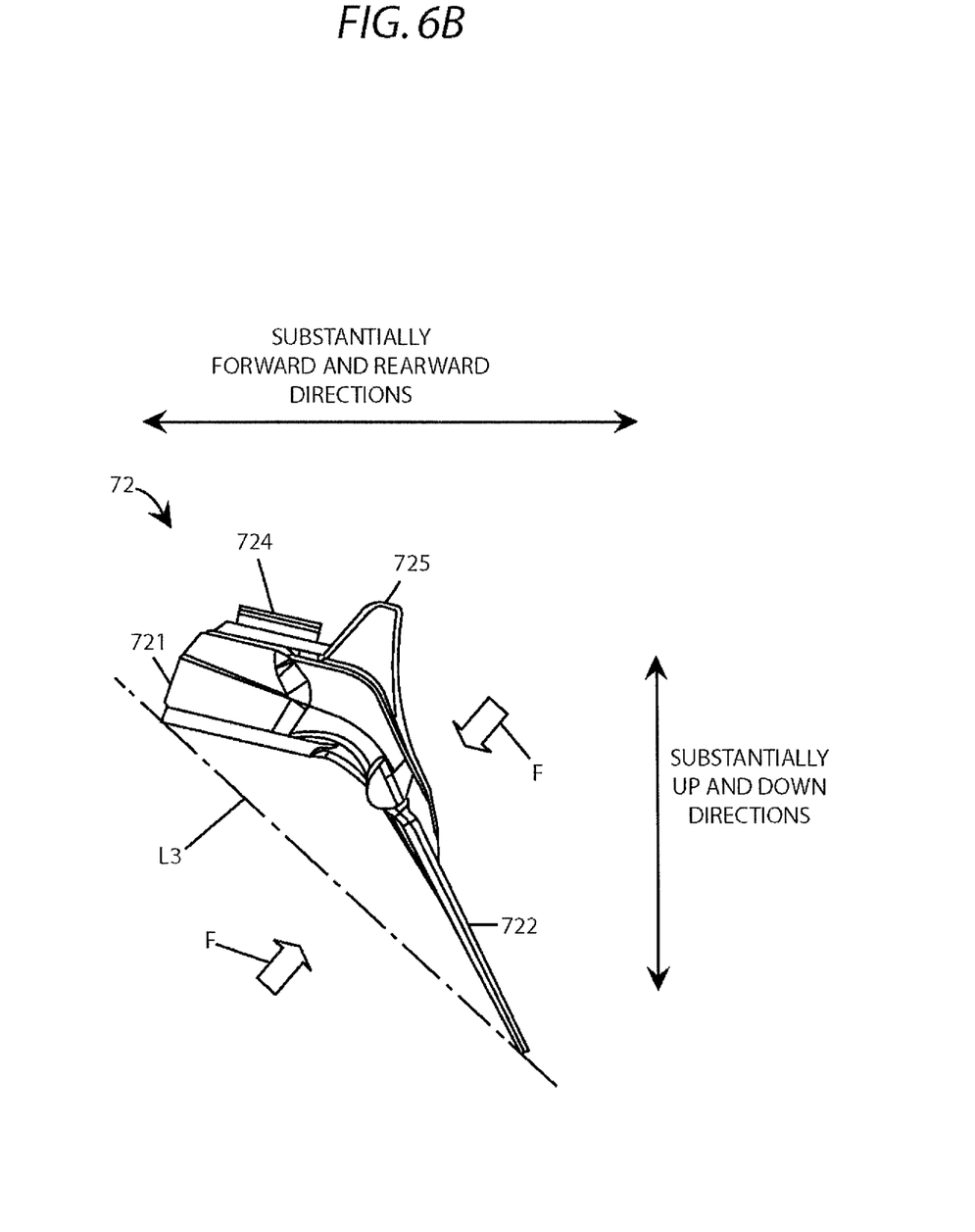
FIG. 6B is a view schematically illustrating a method of forging a lower side head pipe.

FIG. 6B is a view schematically illustrating the method of forging the lower side head pipe 72. The lower side head pipe 72 is forged by the obliquely split molds. Concretely, as illustrated in FIG. 6B, the lower side head pipe 72 is forged by obliquely split molds having their forging directions (mold moving directions F) inclined rearward with respect to the vertical directions. If the lower side head pipe 72 in this shape is forged by the right and left split molds, the portion between the pair of side wall parts 725 becomes undercut (see FIG. 4). On the other hand, if the lower side head pipe 72 is forged by the front and rear split molds, when the inclination of the front side tongue piece part 722 in the extending direction is small (close to the horizontal direction), the portion between the lower side pipe part 721 and the front side tongue piece part 722 sometimes becomes undercut. Further, if the lower side head pipe 72 is forged by the upper and lower split molds and front and rear split molds, a processing stroke of the molds is increased. The lower side head pipe 72 in this shape has the minimum dimension in the directions substantially perpendicular to a straight line L3 passing through a tip portion of the lower side pipe part 721 and a rear end portion (the lower end portion) of the front side tongue piece part 722. Thus, the forging directions are set to substantially up and down directions inclined rearward (in other words, the directions substantially perpendicular to the straight line L3). According to the structure as above, wastes can be decreased, and further a processing stroke at the time of forging can be shortened.

Figure 6C:
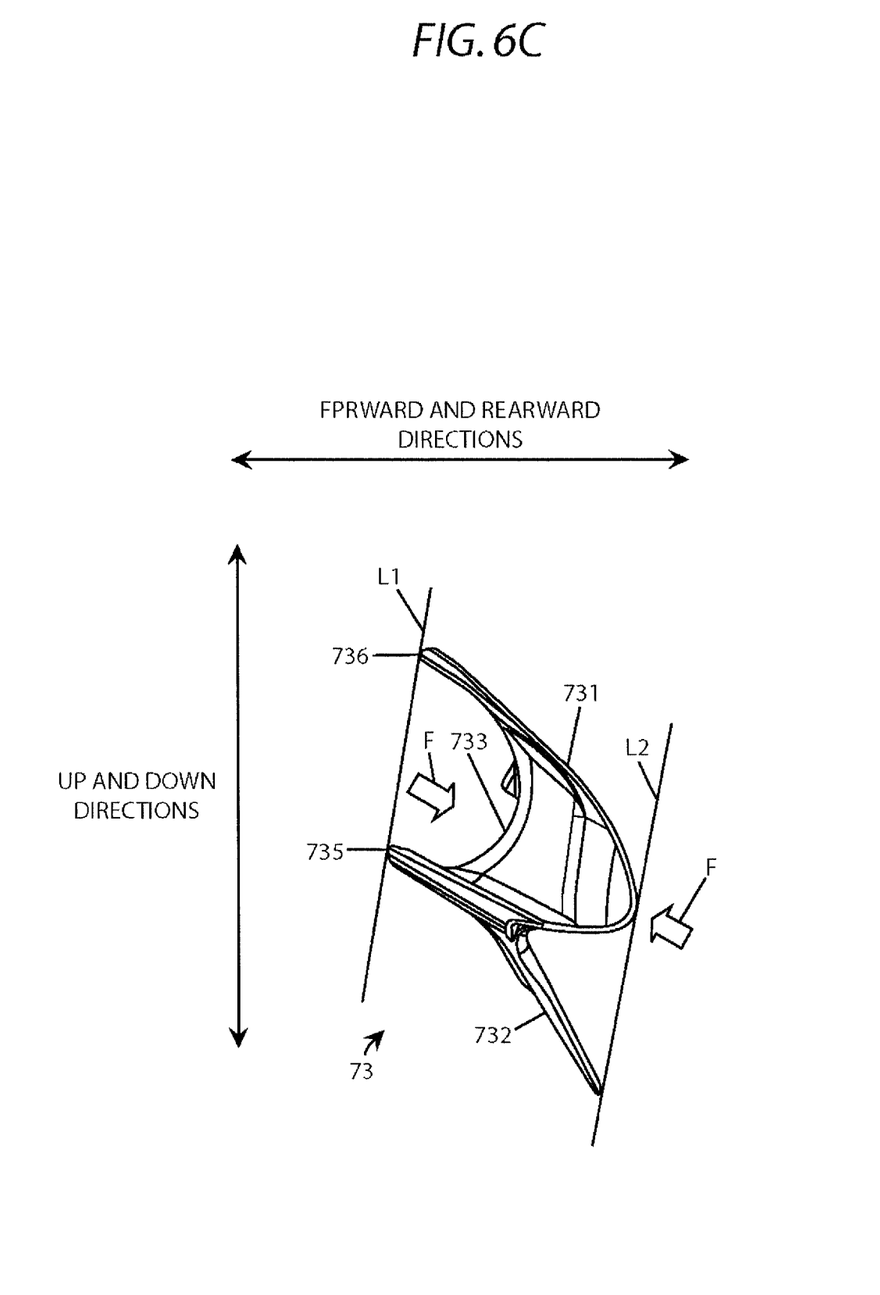
FIG. 6C is a view schematically illustrating a method of forging a main frame gusset.

FIG. 6C is a view schematically illustrating the method of forging the main frame gusset 73. As illustrated in FIG. 6C, the main frame gusset 73 is forged by substantially front and rear split molds (exactly, obliquely split molds having their forging directions (mold moving directions F) inclined forward and upward and rearward and downward with respect to the forward and rearward directions (horizontal directions)). If the main frame gusset 73 in this shape is forged by the upper and lower split molds, the portion between an upper end portion 735 and a lower end portion 736 of the vertical wall part 733 curved rearward becomes undercut, and if the main frame gusset 73 is forged by the right and left split molds, the portion between the pair of rear extending parts 731 becomes undercut (see FIG. 4). A straight line L1 in FIG. 6C is a straight line connecting the upper end portion 735 and the lower end portion 736 of the vertical wall part 733. That is, the straight line L1 is a straight line connecting the areas of the vertical wall part 733 of the main frame gusset 73 joined to the upper side flange 714 and the lower side flange 715 being the pair of upper and lower flanges of the upper side head pipe 71 (joint areas). A straight line L2 in FIG. 6C is a straight line connecting the rear end portions of the rear extending parts 731 and the lower end portion of the rear side tongue piece part 732. The vertical wall part 733 is molded so that the straight line L1 and the straight line L2 are substantially parallel to each other. For this reason, the main frame gusset 73 is designed so as to make the dimension in the substantially forward and rearward directions substantially perpendicular to these straight lines L1 and L2 small. Then, these straight lines L1 and L2 are inclined rearward with respect to the vertical directions. Thus, the forging directions are set to the substantially forward and rearward directions substantially perpendicular to these straight lines L1 and L2 (the oblique directions inclined forward and upward and rearward and downward with respect to the forward and rearward directions), thereby making it possible to decrease wastes and further to shorten a processing stroke at the time of forging.

Figure 6D:
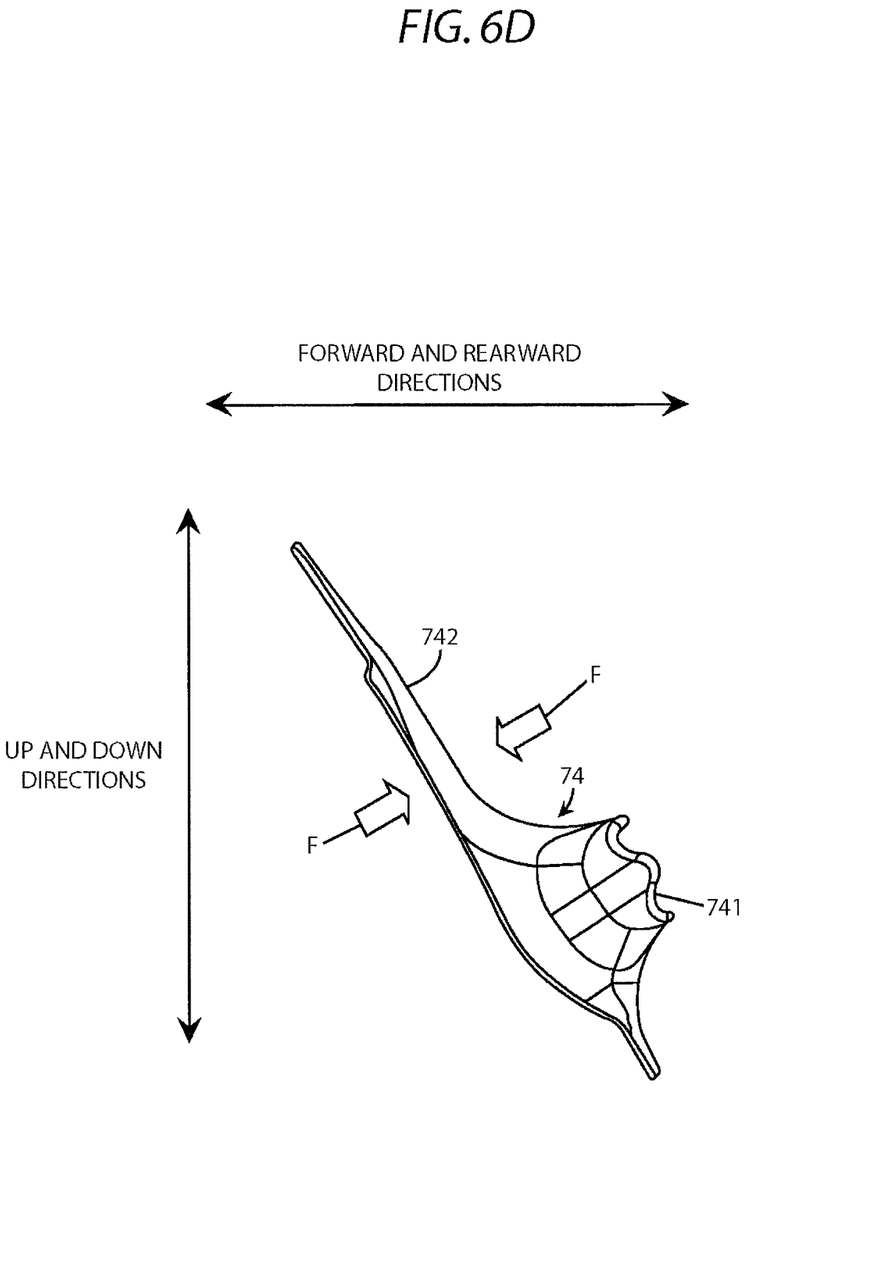
FIG. 6D is a view schematically illustrating a method of forging the bridge pipe gusset.

FIG. 6D is a view schematically illustrating the method of forging the bridge pipe gusset 74. As illustrated in FIG. 6D, the bridge pipe gusset 74 is forged by the obliquely split molds having their forging directions (mold moving directions F) inclined forward and downward and rearward and upward with respect to the forward and rearward directions (horizontal directions). If the bridge pipe gusset 74 in this shape is forged by the upper and lower split molds and the right and left split molds, the portion on the inner side of the attachment part 741 becomes undercut. Further, the joint piece part 742 of the bridge pipe gusset 74 is joined to the down tube 24 so as to fit to the down tube 24 extending obliquely rearward and downward. For this reason, the bridge pipe gusset 74, in a side view, has the minimum dimension in the directions perpendicular to the extending direction of the down tube 24 (namely, the minimum dimension in the directions inclined forward and downward and rearward and upward with respect to the forward and rearward directions). Thus, the forging directions are set to the directions inclined forward and downward and rearward and upward with respect to the forward and rearward directions, thereby making it possible to decrease wastes and further to shorten a processing stroke at the time of forging.

As above, according to the vehicle body frame 2 according to this embodiment, the upper side head pipe 71, the lower side head pipe 72, the main frame gusset 73, and the bridge pipe gusset 74 are molded separately, and thereby the degree of design freedom can be secured without being subjected to the restriction of undercut. For this reason, the upper side head pipe 71, the lower side head pipe 72, the main frame gusset 73, and the bridge pipe gusset 74 can be molded in the forging directions that are suitable respectively without the forging directions being restricted by the shape of another member. For this reason, by decreasing wastes of the respective members, a reduction in weight can be achieved, and further a processing stroke at the time of forging can be shortened. Further, the respective joint lengths between the members are made long, so that the joint strength of the head pipe 21 can be increased. As above, it is possible to secure the degree of design freedom to then mold the vehicle body frame 2 at a low cost, and further to provide the appropriate strength to the vehicle body frame 2.

In the forging, the embodiment of the present invention has been explained in detail, but it should be noted that the above-described embodiment merely illustrates a concrete example of implementing the present invention. The technical scope of the present invention is not to be construed in a restrictive manner by the above-described embodiment. That is, the present invention can be implemented in various forms without departing from the technical spirit or main features thereof.

For example, the size, the shape, and the like of each of the parts of the vehicle body frame (each of the members structuring the vehicle body frame) are not limited to the illustrated structure, and can be changed appropriately within the scope where the effect of the present invention is exhibited. Besides, the size, the shape, and the like of each of the parts of the vehicle body frame (each of the members structuring the vehicle body frame) can be changed appropriately to be implemented as long as they are not departed from the scope of the object of the present invention.

Further, in the vehicle body frame according to this embodiment, each of the pair of right and left rear extending parts of the main frame gusset is formed into a substantially semicircular shape in a side view, but the present invention is not limited to the above structure. The paired right and left rear extending parts 731 are only necessary to smoothly couple the respective inner side wall portions 223 of the pair of right and left main frames 22 and the vertical wall part 733 (so as not to cause sudden changes in dimension, shape, and direction, for example) so as to alleviate the stress concentration, and each of the pair of right and left rear extending parts 731 may also be formed into a substantially rectangular shape in a side view, for example.

Further, in the vehicle body frame according to this embodiment, the structure in which the bridge pipe gusset is joined to the main frame gusset is applied, but the present invention is not limited to the above structure. When the vehicle body frame does not have the bridge pipe, the structure in which the bridge pipe gusset is joined to the main frame gusset does not also have to be applied. In the above case, the extension length of the rear side tongue piece part of the main frame gusset is preferably made long.

Further, in the vehicle body frame according to this embodiment, the structure in which the pair of side wall parts is molded on the both side side portions of the front side tongue piece part in the width direction is applied, but the present invention is not limited to the above structure. The pair of side wall parts is only necessary to be provided so as to increase the joint strength of the lower side head pipe, the upper side head pipe, and the down tube.

According to the present invention, the plural frame structure members are joined to form the head pipe, thereby making it possible to secure the degree of design freedom to then mold the vehicle body frame at a low cost, and to provide the appropriate strength to the vehicle body frame.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A vehicle body frame comprising:
   a head pipe;
   a pair of right and left main frames extending rearward from said head pipe; and
   a down frame extending downward from said head pipe, wherein
   said head pipe further includes:
      an upper side head pipe provided with an upper side pipe part and a pair of upper and lower facing piece parts extending from the upper side pipe part so as to fit to upper wall portions and lower wall portions of said main frames;
      a lower side head pipe provided with a lower side pipe part joined to the upper side pipe part and a front side tongue piece part extending from the lower side pipe part so as to fit to a front wall portion of said down frame; and
      a reinforcing member that is provided with a vertical wall part positioned between the inner side wall portions of said pair of main frames and a rear side tongue piece part extending from the vertical wall part so as to fit to a rear wall portion of said down frame and is joined to a rear portion of the upper side head pipe, wherein the upper side head pipe and the lower side head pipe of the head pipe are formed separately and joined to each other to form the head pipe, wherein, on the reinforcing member, a pair of right and left rear extending parts extending rearward from the vertical wall part along the inner side wall portions of said pair of right and left main frames is provided, wherein the vertical wall part of the reinforcing member is joined to rear end portions of the pair of upper and lower facing piece parts, and wherein, in a side view, a straight line connecting joint areas of the vertical wall part joined to the pair of upper and lower facing piece parts and a straight line connecting rear end portions of the rear extending parts and a rear end portion of the rear side tongue piece part are formed to be substantially parallel to each other.

2. A vehicle body frame comprising:
a head pipe;
a pair of right and left main frames extending rearward from the head pipe; and
a down frame extending downward from the head pipe, wherein
the head pipe further includes:
   an upper side head pipe provided with an upper side pipe part and a pair of upper and lower facing piece parts extending from the upper side pipe part so as to fit to upper wall portions and lower wall portions of the main frames;
   a lower side head pipe provided with a lower side pipe part joined to the upper side pipe part and a front side tongue piece part extending from the lower side pipe part so as to fit to a front wall portion of the down frame; and
   a reinforcing member that is provided with a vertical wall part positioned between the inner side wall portions of the pair of main frames and a rear side tongue piece part extending from the vertical wall part so as to fit to a rear wall portion of the down frame and is joined to a rear portion of the upper side head pipe, the upper side head pipe is forged by right and left split molds, the lower side head pipe is forged by obliquely split molds having forging directions inclined rearward with respect to vertical directions, and the reinforcing member is forged by obliquely split molds having forging directions inclined forward and downward with respect to forward and rearward directions.

3. The vehicle body frame according to claim 1, wherein middle portions of said pair of right and left main frames and a middle portion of said down frame are coupled via a bridge pipe, and to the rear side tongue piece part of the reinforcing member, a bridge pipe attachment part for attaching the bridge pipe is joined so as to fit to the rear wall portion of said down frame.

4. The vehicle body frame according to claim 1, wherein on the front side tongue piece part of the lower side head pipe, a pair of side wall parts is provided so as to fit to both side wall portions of said down frame, and the pair of side wall parts is joined to the upper side pipe part in a manner to extend upward rather than a joint surface of the upper side pipe part and the lower side pipe part.

* * * * *